United States Patent
Linser et al.

(10) Patent No.: US 9,255,650 B2
(45) Date of Patent: Feb. 9, 2016

(54) MOVABLE VALVE APPARATUS HAVING CONDITIONED LUBRICATING SURFACES

(71) Applicant: FISHER CONTROLS INTERNATIONAL LLC, Marshalltown, IA (US)

(72) Inventors: Mark John Linser, Marshalltown, IA (US); Wilbur D. Hutchens, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 84 days.

(21) Appl. No.: 14/105,875

(22) Filed: Dec. 13, 2013

(65) Prior Publication Data

US 2014/0097373 A1 Apr. 10, 2014

Related U.S. Application Data

(63) Continuation of application No. 12/777,689, filed on May 11, 2010, now Pat. No. 8,632,053.

(51) Int. Cl.
*F16K 41/02* (2006.01)
*F16K 51/00* (2006.01)

(52) U.S. Cl.
CPC ............ *F16K 51/00* (2013.01); *F16K 41/02* (2013.01); *Y10T 29/4941* (2015.01); *Y10T 29/49419* (2015.01)

(58) Field of Classification Search
CPC ....... F16K 51/00; F16K 41/02; F16K 41/026; F16K 41/023; F16K 3/36; Y10T 29/49149
USPC .......... 251/214, 335; 123/188.9; 29/890.123, 29/890.126, 890.128; 277/539, 510
See application file for complete search history.

(56) References Cited

U.S. PATENT DOCUMENTS

| | | | |
|---|---|---|---|
| 1,416,431 A * | 5/1922 | Gemmel | 137/246.21 |
| 2,048,247 A | 7/1936 | Davis | |
| 2,058,143 A | 10/1936 | Flanders | |
| 3,092,139 A | 6/1963 | Otis et al. | |
| 4,340,204 A | 7/1982 | Herd | |
| 5,056,757 A | 10/1991 | Wood | |

(Continued)

FOREIGN PATENT DOCUMENTS

| | | |
|---|---|---|
| JP | 04-041590 A | 2/1992 |
| JP | 04-316781 A | 11/1992 |

(Continued)

OTHER PUBLICATIONS

Emerson Process Management, "Fisher Control-Disk Valve," Feb. 2009, 12 pages.

(Continued)

*Primary Examiner* — Marina Tietjen
(74) *Attorney, Agent, or Firm* — Hanley, Flight and Zimmerman, LLC

(57) ABSTRACT

Movable valve apparatus having conditioned lubricating surfaces are described. An example valve includes a valve packing having a graphite packing ring disposed within a bonnet of the fluid valve and a stem or shaft has a conditioned surface to hold a lubricating material. The conditioned surface of the stem or shaft is disposed within the bonnet and moves the lubricating material relative to and in contact with the graphite packing ring during operation of the fluid valve.

20 Claims, 8 Drawing Sheets

(56) References Cited

U.S. PATENT DOCUMENTS

| | | | |
|---|---|---|---|
| 5,299,812 | A | 4/1994 | Brestel et al. |
| 5,542,681 | A | 8/1996 | Hutchens et al. |
| 6,247,679 | B1 | 6/2001 | Robert |
| 6,283,389 | B1 | 9/2001 | Hofmann |
| 6,736,404 | B1 | 5/2004 | Shuster |

FOREIGN PATENT DOCUMENTS

| | | |
|---|---|---|
| JP | 05-19339 | 3/1993 |
| JP | 05-117676 | 5/1993 |
| JP | 08-004942 A | 1/1996 |
| JP | 11-230006 A | 8/1999 |
| JP | 2003-185027 A | 7/2003 |
| JP | 2005-042845 A | 2/2005 |
| JP | 2007-024121 A | 2/2007 |

OTHER PUBLICATIONS

Emerson Process Management, "Enviro-Seal Valve Packing Systems," Aug. 2003, 12 pages.

Emerson Process Management, "Fisher Packing Selection Guidelines for Sliding-Stem Valves," product bulletin, Jul. 2009, 8 pages.

Emerson Process Management, "Fisher Enviro-Seal and High-Seal Packing Systems for Sliding Stem Valves," product bulletin, Jul. 2009, 8 pages.

Emerson Process Management, "Fisher Enviro-Seal Packing System for Rotary Valves," instruction manual, Aug. 2009, 16 pages.

Emerson Process Management, "Enviro-Seal Packing Systems—Rotary," product bulletin, Dec. 2009, 4 pages.

International Searching Authority, "International Search Report," issued in connection with application serial No. PCT/US2011/034211, mailed Jul. 28, 2011, 2 pages.

International Searching Authority, "Written Opinion of the International Searching Authority," issued in connection with application serial No. PCT/US2011/034211, mailed Jul. 28, 2011, 6 pages.

United States Patent and Trademark Office, "Non-Final Office Action," issued in connection with U.S. Appl. No. 12/777,689, on Nov. 5, 2012 (10 pages).

United States Patent and Trademark Office, "Final Office Action," issued in connection with U.S. Appl. No. 12/777,689, on May 23, 2013 (15 pages).

United States Patent and Trademark Office, "Advisory Action," issued in connection with U.S. Appl. No. 12/777,689, on Jul. 10, 2013 (3 pages).

United States Patent and Trademark Office, "Notice of Allowance," issued in connection with U.S. Appl. No. 12/777,689, on Sep. 13, 2013 (15 pages).

The State Intellectual Property Office of the People's Republic of China, "First Office Action", issued in connection with corresponding Chinese Patent Application No. 201180030369.1 mailed on Dec. 30, 2013 (9 pages).

Japanese Patent Office, "Notice of Reasons for Refusal", issued in connection with Japanese patent application No. 2013-510124, mailed on Feb. 4, 2015, 16 pages.

* cited by examiner

US 9,255,650 B2

MOVABLE VALVE APPARATUS HAVING CONDITIONED LUBRICATING SURFACES

FIELD OF THE DISCLOSURE

This disclosure relates generally to fluid valves and, more particularly, to movable valve apparatus having conditioned lubricating surfaces.

BACKGROUND

Fluid valves, such as rotary valves, linear valves, etc., typically include a fluid flow control member that is disposed in the fluid path and that is operatively coupled to an actuator such as, for example, a pneumatic actuator, a manual actuator, etc. A valve stem or shaft operatively couples the flow control member to the actuator, which moves the flow control member between an open position and a closed position to allow or restrict fluid flow between an inlet and an outlet of the valve. Typically, the valve stem or shaft extends between the flow control member and the actuator through a bonnet coupled to the valve body.

A valve packing or packing assembly is often employed to prevent leakage of process fluid to the environment through the valve body along the valve stem or shaft. The valve packing may include a plurality of springs and/or packing seals disposed along a portion of the valve stem or shaft to provide a seal. Some known valve packings employ a high-spring rate loading device or spring assembly (e.g., Belleville springs) to provide a relatively high load over a relatively small range of deflection or compression.

Failure to provide a desired packing stress to the packing seals may cause an improper seal. For example, a packing stress that is too low may cause the process fluid to leak to the environment through the packing seals. A packing stress that is too large (e.g., greater than a maximum recommended packing stress) may cause some types of packing seals (e.g., graphite seals) to transfer material to a valve stem or shaft, thereby causing build-up of material (e.g., graphite) on the valve stem or shaft and damaging the packing seal. Additionally or alternatively, packing stresses that are too high may increase packing friction between the packing seals and the valve stem or shaft, which may reduce valve performance and/or the operational life of the valve packing and/or the valve stem or shaft.

SUMMARY

In one example, a valve includes a valve packing having a graphite packing ring disposed within a bonnet of the fluid valve and a stem or shaft has a conditioned surface that holds a lubricating material. The conditioned surface of the stem or shaft is disposed within the bonnet and moves the lubricating material relative to and in contact with the graphite packing ring during operation of the fluid valve.

In another example, an apparatus for use with a fluid valve includes a movable valve apparatus made of a first material. The movable valve apparatus is to move relative to a second surface made of a second material that is softer than the first material. A conditioned surface holds a lubricating material along a portion of the movable valve apparatus that is to contact the second surface in operation.

DETAILED DESCRIPTION

Figure 1A:
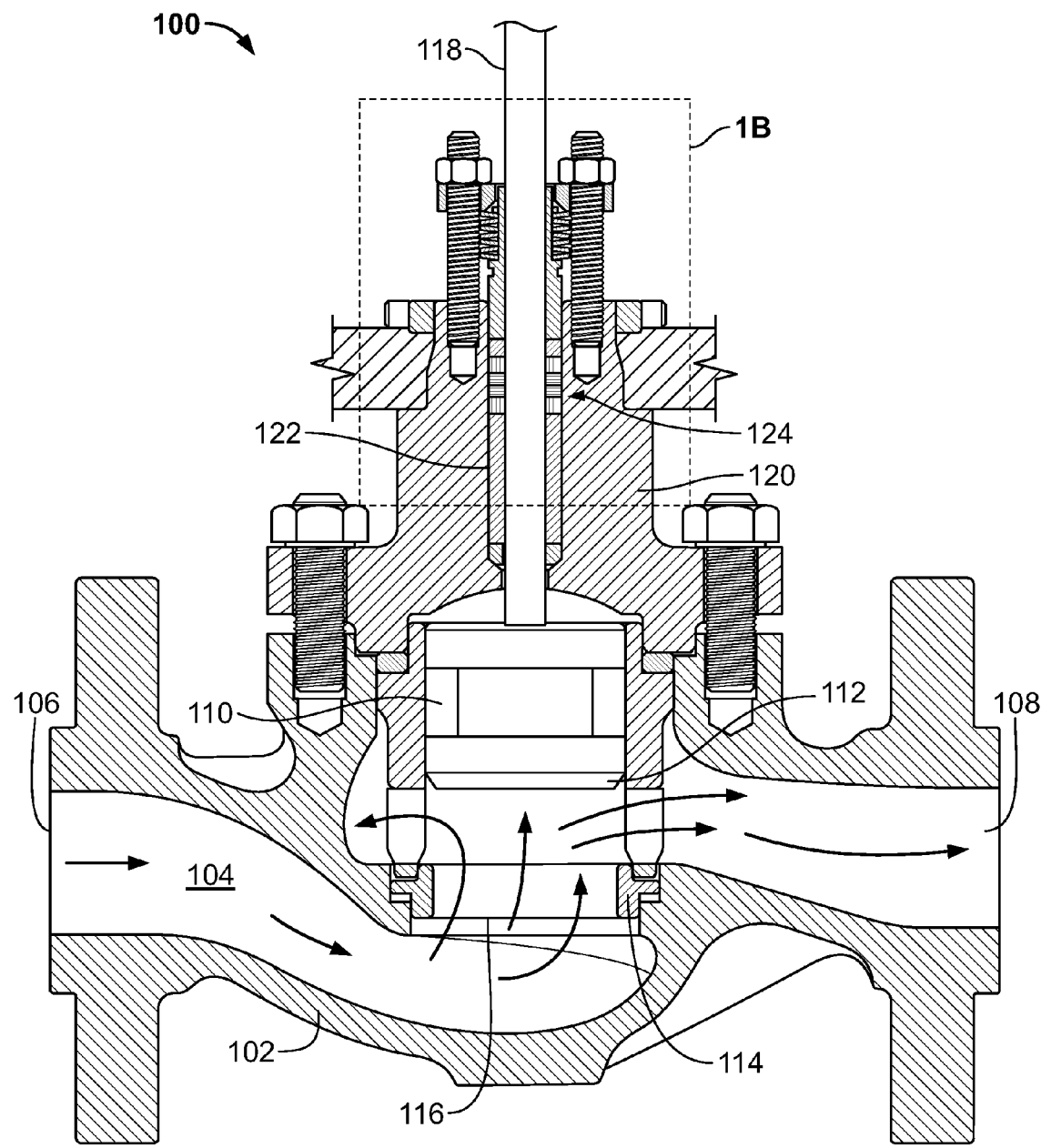
FIG. 1A illustrates a known fluid valve.

In general, the example methods and apparatus described herein substantially reduce or prevent material transfer at a dynamic mechanical interface between two dissimilar materials. More specifically, the methods and apparatus described herein significantly reduce friction at the interface between a first or hard material surface and a second or relatively softer material surface when the hard surface moves relative to and in contact with the relatively softer material surface. In the examples described herein, at least a portion of the hard surface includes a conditioned surface having a lubricating material enfolded by, embedded with, deposited within, enveloped with, transferred to or otherwise held by the conditioned surface. In some examples, the lubricating material is a material substantially similar or identical to the relatively softer material. In other words, a lubricating material or material deposits (e.g., a softer material) is transferred to, enfold by, impregnated within, or embedded on the conditioned surface. In operation, the conditioned surface enfolded with (or holding) the lubricating material contacts or engages the relatively softer material. In this manner, the example apparatus described herein provide an interface between similar materials instead of two dissimilar materials, thereby significantly reducing friction at the interface between the dissimilar materials.

In particular, an example apparatus described herein substantially prevents material transfer between a valve stem or valve shaft that moves (e.g., rotates or slides) relative to and in contact with a packing material (e.g., a graphite packing material). The conditioned surface may have a textured surface or a relatively smooth or non-textured surface (e.g., a surface finish having Arithmetic Average Roughness (Ra) less than 32 micro-inches) to enfold the lubricating material. More specifically, at least a portion of the valve stem or shaft may be conditioned to include a textured surface (e.g., textured surfaces 410-414 of FIGS. 4A-4C) or a non-textured surface or relatively smooth surface (e.g., a non-textured surface 416 of FIG. 4D). For example, the conditioned surface may be textured via suitable manufacturing processes (e.g., etching, machining, knurling) at an interface where an outer surface of the stem or shaft contacts the packing material (e.g., a graphite packing) during operation of a fluid valve. The condition surface enfolds (e.g., is embedded or impregnated with) a lubricating material or agent. The lubricating material may be a material (e.g., a graphite material) substantially similar or identical to the packing material which the valve stem or shaft contacts during operation of the fluid valve. In other examples, the lubricating material may be any suitable material such as, for example, polytetrafluoroethylene (reinforced with carbon fiber and PTFE), silicon, graphite, polyolefins, high-density polyethylene, low-density polyethylene, Kevlar® composite, any combination thereof and/or any other suitable lubricating materials such as, for example, a dry lubricating agent, an inert binding agent, polymers, etc.

In one particular example, the textured surface or portion of the valve stem or shaft may be formed via at least one cavity or pocket that enfolds, or is embedded, filled, enveloped or impregnated with the lubricating material. In yet other examples, the conditioned surface may provide a glazed surface. As a result, friction between the valve apparatus and the packing material is significantly reduced when the valve stem or shaft moves relative to the packing material, thereby reducing wear or damage to the packing material and/or valve stem and shaft.

Figure 1B:
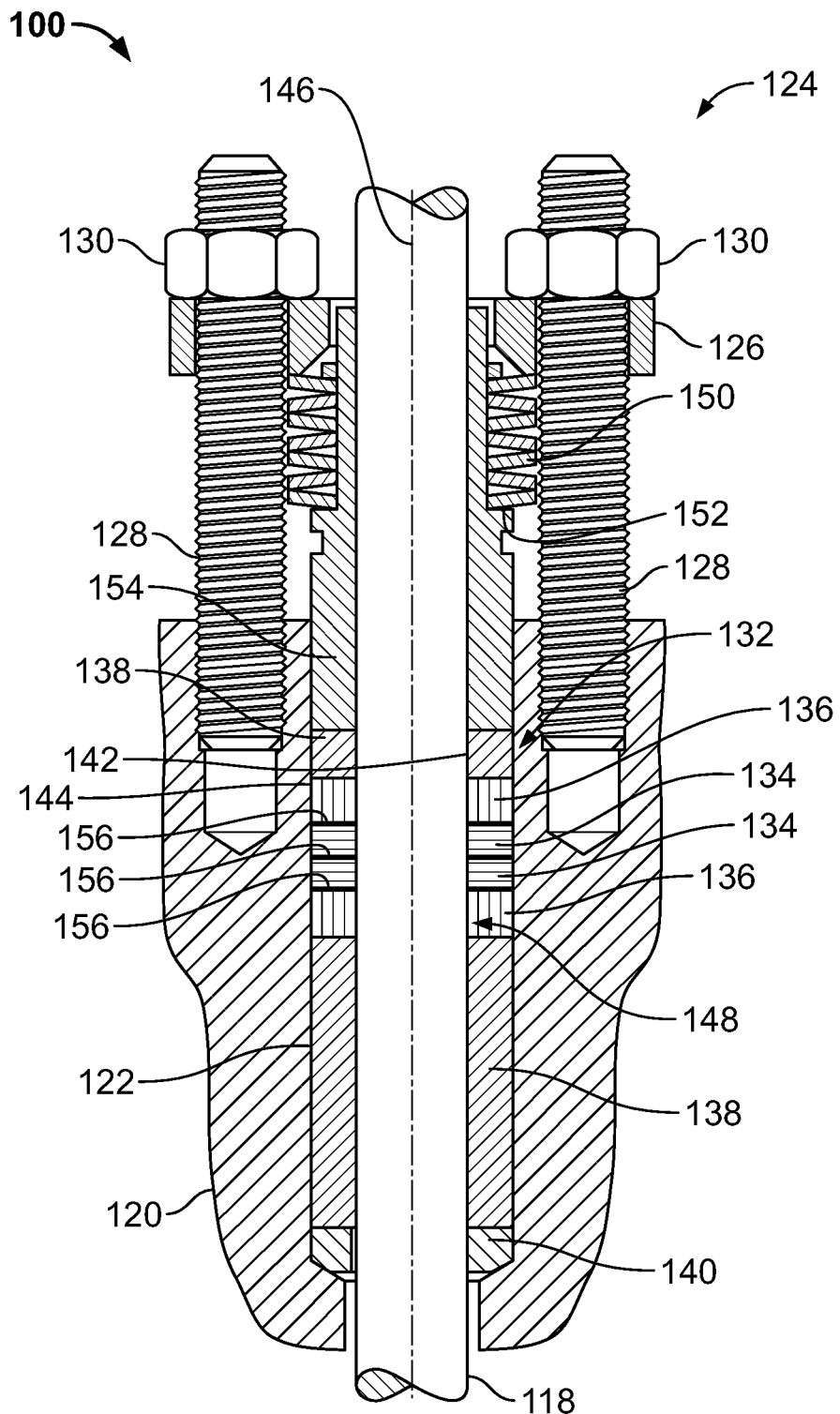
FIG. 1B is an enlarged view of the example fluid valve of FIG. 1A.

Before describing the example methods and apparatus, a brief discussion of a known fluid valve 100 is provided in connection with FIGS. 1A and 1B. FIG. 1A is a cross-sectional view of the fluid valve 100 (e.g., a sliding-stem valve). FIG. 1B illustrates an enlarged portion of the fluid valve 100 of FIG. 1A. The fluid valve 100 includes a valve body 102 that defines a fluid flow passageway 104 between an inlet 106 and an outlet 108. A valve plug 110 is disposed within the fluid flow passageway 104 and includes a seating surface 112 that cooperates with a valve seat 114 to control a port area 116 through which fluid may flow between the inlet 106 and the outlet 108. A valve stem 118 extends through a bonnet 120 to couple the valve plug 110 to an actuator (not shown) (e.g., a pneumatic actuator, an electric actuator, a manual actuator, etc.). The bonnet 120 includes a packing bore 122 to receive or house a valve packing assembly 124, which slidably receives the valve stem 118 as the actuator moves the valve stem 118 between a first position (e.g., an open position) and a second position (e.g., a closed position). The valve packing assembly 124 provides a seal to prevent leakage of process fluid past the valve stem 118 and/or protects the environment against the emission of hazardous or polluting fluids. In other words, the valve packing assembly 124 provides a seal that opposes the pressure of the process fluid flowing through the fluid flow passageway 104.

As most clearly shown in FIG. 1B, the valve packing assembly 124 includes a packing flange 126 coupled to the bonnet 120 via packing studs 128 and packing nuts 130. A packing material or seal assembly 132 surrounds the valve stem 118 and is disposed within the packing bore 122 of the bonnet 120. In this example, the packing material or seal assembly 132 includes graphite packing seals or rings 134 (e.g., flexible graphite rings), graphite composite packing rings 136 (e.g., graphite composite packing end rings), carbon bushings 138, and packing box ring 140.

The packing material 132 is typically compressed axially to ensure that an inner bore or surface 142 of the packing material 132 is sealed against the valve stem 118 and that an outer surface 144 of the packing material 132 is sealed against the packing bore 122 of the bonnet 120. Axially loading the packing material 132 along an axis 146 causes the packing material 132 to expand radially to provide a dynamic seal on the moving valve stem 118 at an interface or line of motion 148 where the packing material 132 is in contact with the valve stem 118 and provide a static seal in the packing bore 122 where the packing material 132 is in contact with the packing bore 122.

Thus, the valve packing assembly 124 must be properly or sufficiently loaded to provide a packing seal that can oppose the pressure of the process fluid flowing through the fluid valve 100. To maintain a seal, the packing material 132 must be kept under load (e.g., an axial load). Thus, when the packing load is insufficient, it hinders the ability of the packing material 132 to properly seal. On the other hand, when the packing load is excessive, high stem friction is generated, which can reduce the useful life of the packing material 132 and cause valve sticking.

In the illustrated example, a plurality of biasing elements or springs 150 (e.g., Belleville springs) may be positioned or stacked in series between the packing flange 126 and a flange or shoulder 152 of a packing follower 154. The packing nuts 130 may be used to adjustably drive or urge the springs 150 against the packing follower 154 which, in turn, axially compresses the packing material 132 to provide a seal and prevent leakage of process fluid past the valve stem 118. As the packing nuts 130 are tightened on the packing studs 128, the packing flange 126 transmits a load to the springs 150. The springs 150 deflect or compress as the packing nuts 130 are tightened to provide a packing stress (e.g., an axial load) to the packing material 132 via the packing follower 154.

In this example, the springs 150 provide a live-load valve packing by providing a uniform load to the packing material 132 and maintaining such a uniform packing load during valve operation (e.g., valve stroking). In other words, the springs 150 provide a substantially constant load to the packing follower 154 to exert a substantially constant compressive force on the packing material 132. Thus, if the packing material 132 consolidates (e.g., due to wear), the springs 150 extend to move the packing follower 154 toward the bonnet 120 to maintain a compressive force on the packing material 132 and thereby maintain the seal integrity of the packing material 132.

When under a packing load, the graphite composite rings 136 being somewhat harder material than the graphite packing rings 134 act as anti-extrusion members to help prevent transfer of the somewhat softer flexible graphite material of the graphite packing rings 134 to the valve stem 118. Further, the carbon bushings 138 being considerably harder material than the graphite composite rings 136 aid in maintaining the valve stem 118 centered in the packing to prevent deformation and destruction of the softer packing material in the graphite packing rings 134 and the graphite composite rings 136.

Operating conditions (e.g., a temperature and/or a pressure of a process fluid, type of process fluid or application, etc.) often determine the type of packing material to be used to provide an adequate seal for the particular process fluid or application. Some known packing materials such as, for example, graphite packing materials may be used in severe service conditions (e.g., process fluid temperatures greater than 450° F., pressures up to approximately 4,500 psig). For example, a Grafoil® packing is less susceptible to differential thermal expansion than, for example, a polytetrafluoroethylene (PTFE) packing (e.g., Teflon®). Such graphite packing materials (e.g., a Grafoil® packing) may require higher axial packing loads to function and/or effect a proper seal. However, as noted above, higher axial loads create relatively higher valve stem friction. Additionally, in some instances, such graphite packing materials may require lubricating materials or agents to reduce friction at the interface 148 between the valve stem 118 and the packing material 132 when the valve stem 118 moves relative to the packing material 132. Otherwise, if the packing stress provided is too high, a relatively high packing friction may result, which can reduce valve performance and/or reduce packing material operating life.

For example, a packing stress that is relatively high or greater than a maximum desired packing stress may cause some packing materials such as graphite packing materials to disintegrate. Such disintegration of the packing material can cause uncontrolled deposits of graphite material on a valve stem, which may cause an improper seal or premature failure and, thus, leakage of fluid past the valve stem and to the environment.

In this example, the graphite packing ring 134 is a laminated graphite/PTFE packing ring having a PTFE material (e.g., Teflon®) to prevent transfer between the graphite packing material and the valve stem 118. An example composite laminated ring is described in U.S. Pat. No. 5,299,812 and U.S. Pat. No. 5,542,681, both of which are incorporated herein by reference in their entireties.

To further prevent or reduce the likelihood of material transfer between graphite packing materials and a valve stem or shaft, a packing assembly may include packing washers or discs made of PTFE material. For example, the packing assembly 132 of FIGS. 1A and 1B includes packing washers or discs 156 made of a PTFE material that are disposed between the graphite packing rings 134 and the graphite composite rings 136. The PTFE packing washers 156 provide lubrication (and a seal) at the interface or line of motion 148 between the valve stem 118 and the packing material 132, thereby substantially reducing friction and material transfer between the graphite packing rings 134 and/or graphite composite rings 136 and the valve stem 118. More specifically, the PTFE packing washers 156 partially extrude against the valve stem 118 to provide lubrication to the valve stem 118 as it is moving or sliding through the packing assembly 124. As a result, material buildup on the valve stem 118 that may otherwise result from the disintegration of the graphite packing rings 134 and/or the graphite composite rings 136 is substantially reduced or eliminated with the use of the PTFE packing washers 156.

However, in some applications such as Nuclear applications, the use of a packing material that includes PTFE material (e.g., the Graphite/PTFE composite packing material 132) may not be permitted. In such applications, a packing made of pure graphite material is often employed. However, as noted above, use of packing materials made of graphite without a lubricating material or agent (e.g., in the laminated graphite/PTFE packing rings 134 and the PTFE packing washers 156) increases the friction between the interface or line of motion 148 of the valve stem 118 and the packing material 132, leading to premature wear or damage to the packing material 132 and/or the valve stem 118.

Figure 2:
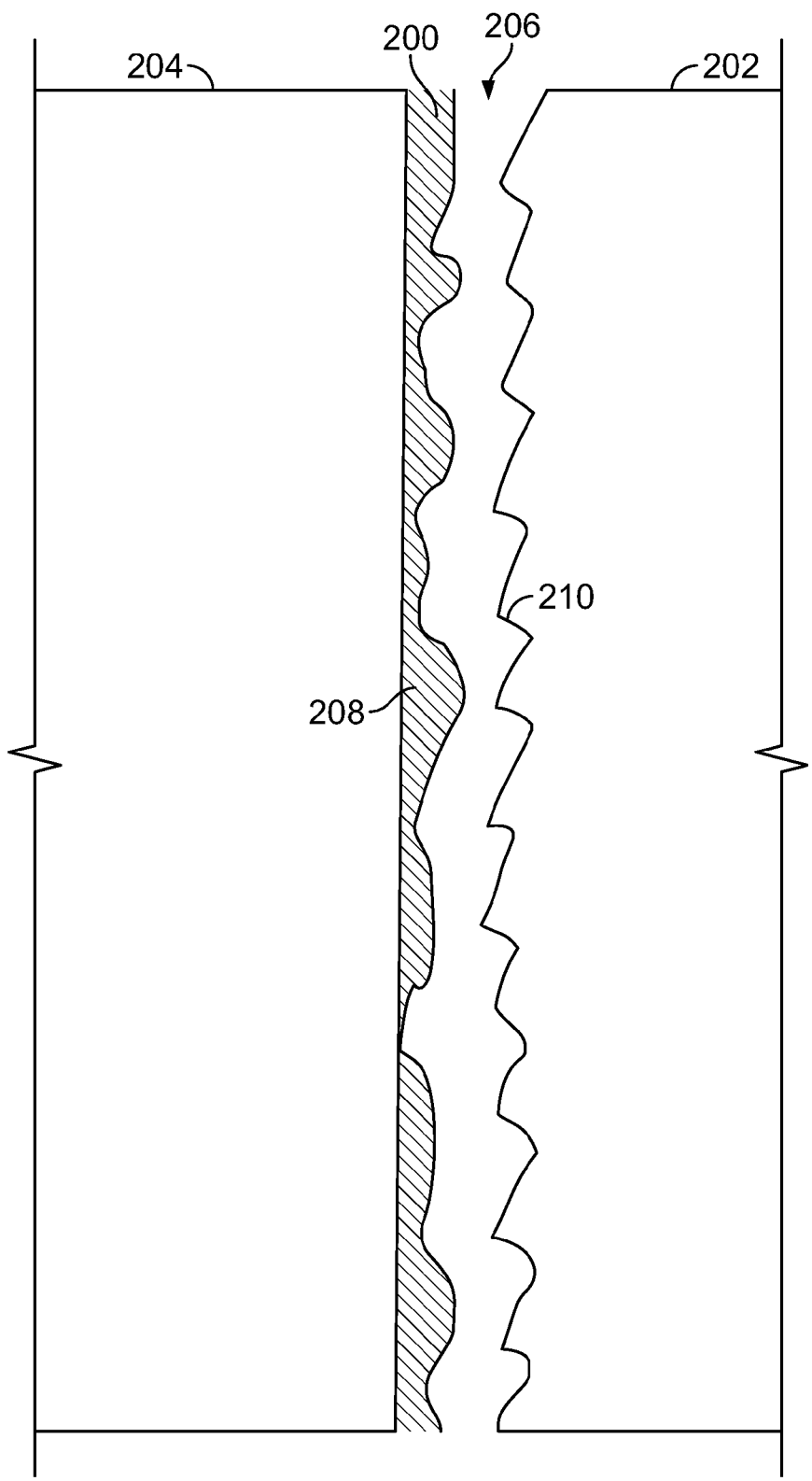
FIG. 2 illustrates an enlarged view of a known valve apparatus and a packing material.

FIG. 2 generally illustrates an uncontrolled transfer or build-up of material deposits 200 between a softer material or a packing material 202 and a relatively harder material or valve apparatus 204 (e.g., a valve stem or shaft) that does not include a lubricating material or agent. For example, unlike the example packing assembly 124 of FIGS. 1A and 1B, the example packing material 202 of FIG. 2 does not include the PTFE packing washers 156 and/or any composite material having a PTFE material. As shown, the material deposits 200 transfer to the valve apparatus 204 along an interface or line of motion 206 where the valve apparatus 204 contacts the packing material 202 as the valve apparatus 204 moves (e.g., slides or rotates) relative to the packing material 202. The packing material 202 (e.g., a graphite packing) is typically softer than the material (e.g., stainless steel, etc.) of the valve apparatus 204. Thus, the packing material 202 yields to the valve apparatus 204 and typically disintegrates as the valve apparatus 204 moves (e.g., slides or rotates) relative to the packing material 202 absent a lubricating material (e.g., in the laminated graphite/PTFE packing rings 134 and the PTFE packing washers 156 of FIGS. 1A and 1B), thereby causing the build-up of the material deposits 200 on the valve apparatus 204. The build-up of the material deposits 200 may cause a face or surface 208 of the valve apparatus 204 to become scratched, scuffed or otherwise damaged. Additionally or alternatively, for example, a face 210 of the packing material 202 may become damaged or worn, causing the packing material 202 to fail in operation (i.e., fail to provide a seal and causing leakage of fluid past the packing material 202). In other words, the material deposits 200 are uncontrolled and, thus, have an undefined profile or shape, which interferes with the sealing function of the packing material 202 because the packing material 202 may not be able to evenly engage or contact and form a seal against the valve apparatus 204.

In some examples, a packing assembly (e.g., the packing assembly 124 of FIGS. 1A and 1B) may include a wiper apparatus or ring. The wiper ring may remove material build-up or material deposits 200 away from the valve apparatus 204 as the valve apparatus 204 moves between a first position (e.g., an open position) and a second position (e.g., a closed position). However, as the material deposits 200 are removed from the valve apparatus 204, the packing stress or load is adjusted either manually (e.g., via the packing nuts 130 of FIGS. 1A and 1B) and/or via live-loaded packing (e.g., compression of Bellville springs of FIGS. 1A and 1B), thereby loading the packing material 202 and causing the face 210 of the packing material 202 to engage (i.e., re-engage) the face 208 of the valve apparatus 204 as the packing material 202 wears away. However, such adjustments may be frequently required in operation for the packing material 202 to provide a proper seal at the interface 206 as the material deposits 200 continue to form from removed portions of the packing material 202. Frequently adjusting (i.e., increasing) the packing stress or load may cause premature or rapid wear and/or deterioration of the packing material 202, thereby causing leakage of process fluid to the environment along the valve apparatus 204 due to the damaged or worn packing material 202.

Figure 3:
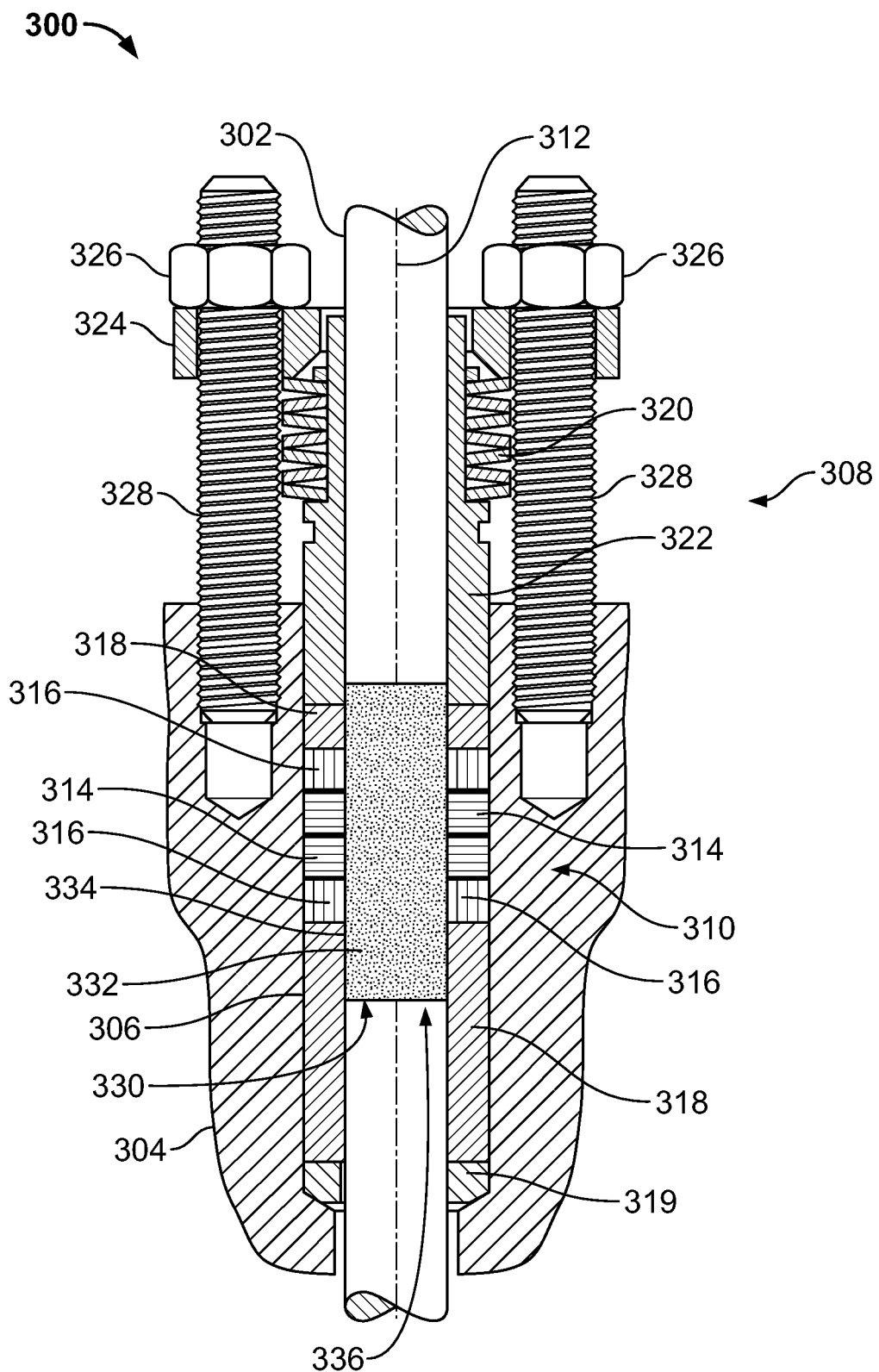
FIG. 3 illustrates a fluid valve implemented with an example valve apparatus described herein.

FIG. 3 illustrates a fluid valve 300 (e.g., a sliding stem valve, etc.) implemented with an example movable valve apparatus 302 described herein. The example movable valve apparatus 302 is a valve stem that is slidably disposed within a bonnet 304 of the fluid valve 300. The movable valve apparatus 302 may be made of stainless steel or any other suitable material(s). The bonnet 304 includes a packing bore 306 to receive or house a packing assembly 308. The packing assembly 308 includes a packing material 310 that slidably receives the movable valve apparatus 302 and substantially surrounds the movable valve apparatus 302 to provide a seal and prevent leakage of process fluid to the environment along an axis 312 of the movable valve apparatus 302. As shown, the packing material 310 includes die molded graphite ribbon packing rings or seals 314, composite packing rings 316, carbon bushings 318 and packing box rings 319. The packing assembly 308 also includes biasing elements 320 (e.g., Belleville springs) to apply a packing stress or load (e.g., a live-loaded packing stress) to the packing material 310 via a follower 322 and a packing flange 324. The packing flange 324 is coupled to the bonnet 304 via packing nuts 326 and packing studs 328. The packing nuts 326 are rotated relative to the packing studs 328 to adjust (e.g., increase or decrease) the packing stress or load to be exerted on the packing material 310 via the biasing elements 320. In contrast to the packing assembly 124 of FIGS. 1A and 1B, the example packing assembly 308 of FIG. 3 does not include the PTFE packing washers 156 or the laminated graphite/PTFE packing ring 134 of FIGS. 1A and 1B.

The movable valve apparatus 302 includes a conditioned surface 330 that enfolds (e.g., is embedded with or otherwise holds) a lubricating material or agent 332 (e.g., a dry lubricating material) along a surface or portion 334 of the movable valve apparatus 302 that engages with the packing material 310 when the movable valve apparatus 302 moves (e.g., slides) relative to the packing material 310. In this example, the lubricating material 332 is a graphite material. However, in other examples, the lubricating material 332 may be a dry lubricating material, a polytetrafluoroethylene (PTFE material), a Polyetheretherketone material (PEEK), a polyolefin, polyethylene, and/or any other lubricating material or material that is substantially similar or identical to the material that the conditioned surface 330 engages in operation.

In operation, an actuator (not shown) moves the movable valve apparatus 302 between a first position and a second position, thereby causing the movable valve apparatus 302 to slide against the packing material 310 along a fault line or interface 336 (e.g., a natural microscopic parting line). As a result, the conditioned surface 330 of the movable valve apparatus 302 may be enfolded by, or be embedded or impregnated with, the same material as the packing material 310 to effectively provide an interface between two substantially similar materials instead of two dissimilar materials.

The example movable valve apparatus 302 significantly reduces friction at the interface 336 between the movable valve apparatus 302 and the packing material 310, thereby reducing wear and prolonging packing operating life. By increasing the operational life of the packing material 310, the example movable valve apparatus 302 described herein significantly reduces costs and shut down time associated with having to replace and/or repair the packing material 310 and/or the movable valve apparatus 302.

FIGS. 4A-4D illustrate example movable valve apparatus 402, 404, 406 and 408 each having a conditioned surface 400 described herein. The example movable valve apparatus 402, 404, 406 and 408 may be valve stems and/or shafts. In general, the conditioned surface 400 of the movable valve apparatus 402, 404, 406 or 408 may include a textured surface 410, 412, or 414 of FIGS. 4A-4C, respectively, or a relatively smooth or non-textured surface 416 shown in FIG. 4D. A textured surface may have, for example, a surface finish or texture having an Arithmetic Average Roughness (Ra) that is greater than 32 micro-inches and a non-textured surface may have, for example, a surface finish or texture having an Arithmetic Average Roughness (Ra) that is less than or equal to 32 micro-inches.

Figures 4A, 4B, 4C:
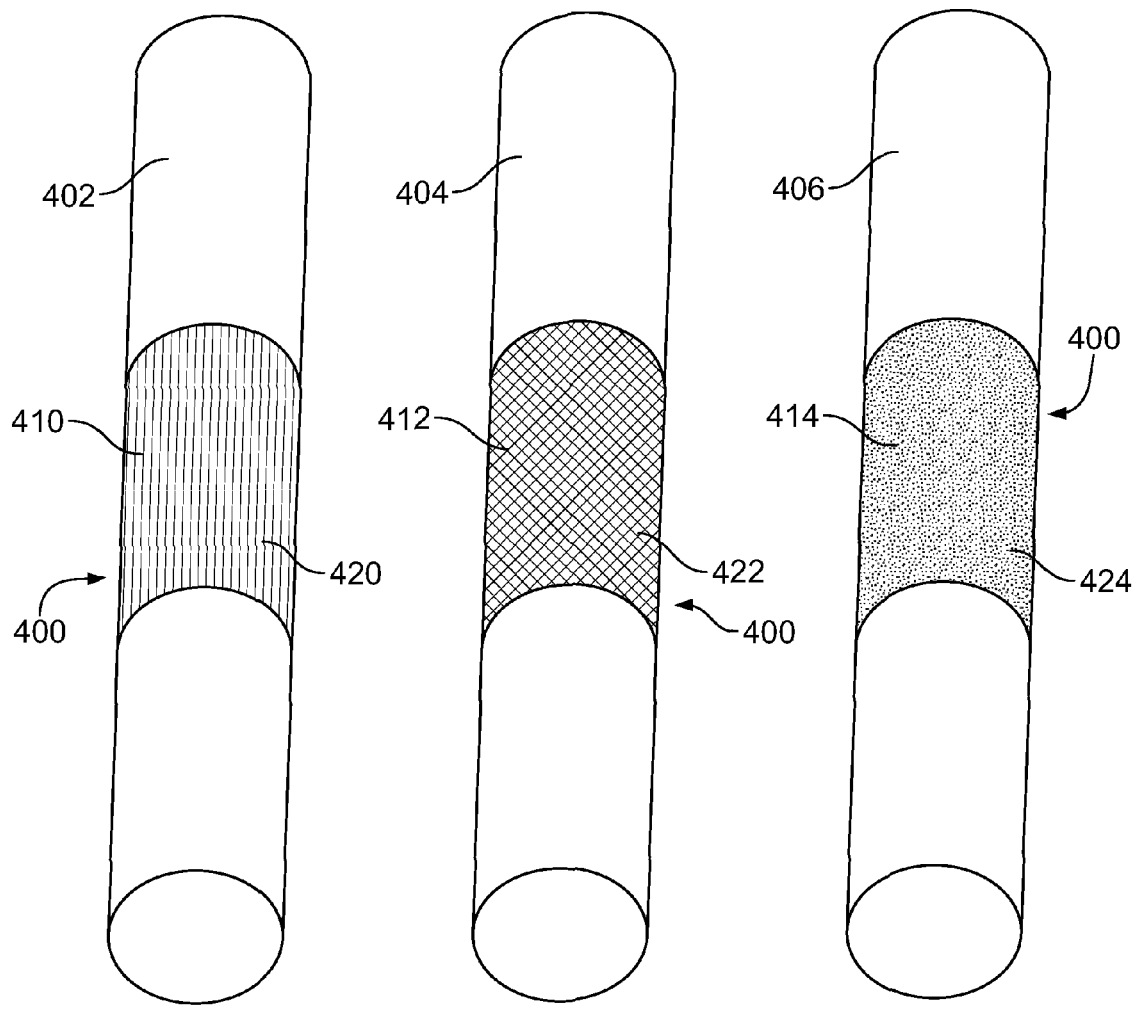
FIGS. 4A-4D illustrate example valve apparatus described herein.
Figure 4D:
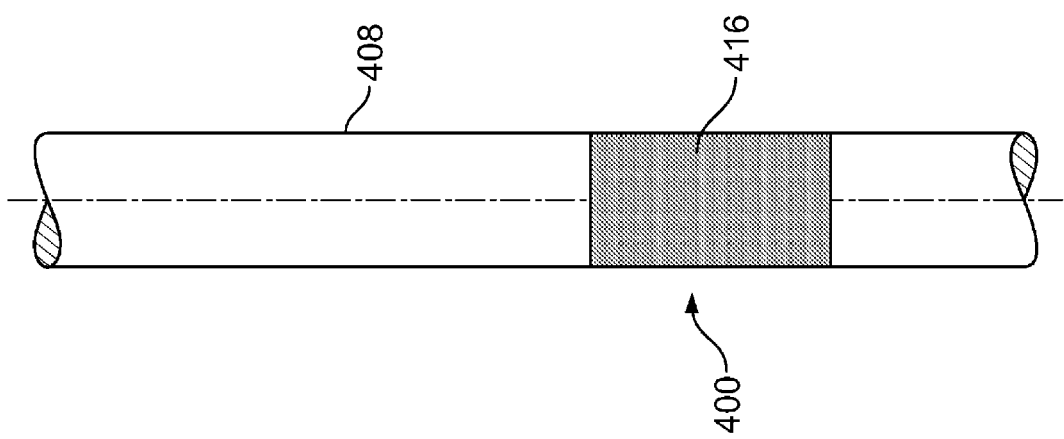

Referring to FIGS. 4A-4C, for example, the textured surface 410 includes a groove or serrated pattern 420, the textured surface 412 includes a matrix or mesh pattern 422, and the textured surface 414 includes a scuffed or chipped pattern 424. The textured surfaces 410, 412, and 414 may be formed via, for example, glazing, knurling, etching (e.g., chemical etching), machining, sandblasting, and/or any other suitable process(es). As will be described in greater detail below, the non-textured surface 416 (e.g., a smooth glazed surface) may be conditioned by moving the valve apparatus 408 relative to a lubricating material such that the lubricating material transfers and/or adheres to the valve shaft 408. In one particular example, a lubricating material may include a bonding material or agent (e.g., PTFE) that helps the lubricating material (e.g., graphite material) adhere or transfer to the non-textured surface 416.

A lubricating material or material deposits (e.g., a softer material) may be transferred to, enfold by, impregnated within, or embedded on the conditioned surface 400 of the movable valve apparatus 402, 404, 406 and 408 via direct methods, indirect methods, or any other suitable manufacturing processes. In general, a buildup or transfer of material deposits or a lubricating material is provided to the conditioned surface 400, which may provide and/or may be processed to provide a glazed surface. Further, any of the textured surfaces 410, 412, or 414 or the non-textured surface 416 may be conditioned via the direct or indirect methods described below in connection with FIGS. 5 and 6, respectively.

Figure 5:
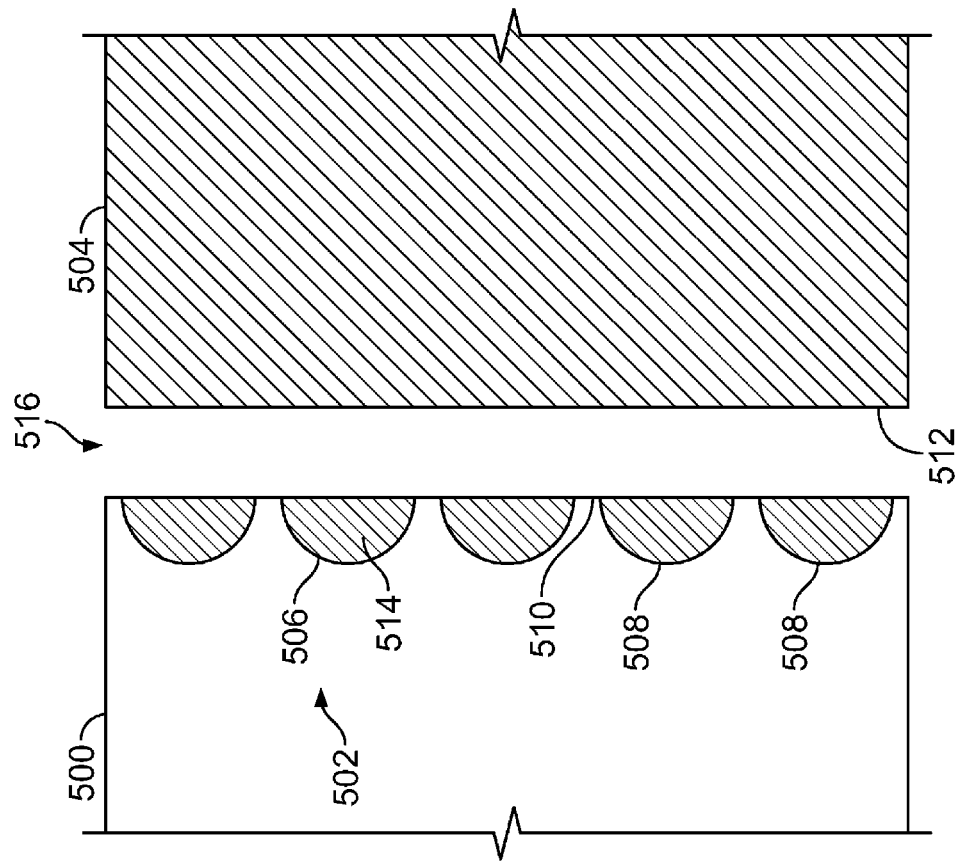
FIG. 5 illustrates an enlarged portion of another example valve apparatus described herein having a surface conditioned via a direct method.

FIG. 5 illustrates an enlarged portion of an example movable valve apparatus 500 having a surface 502 conditioned via the direct method. The conditioned surface 502 is adjacent a packing material 504. As noted above, the conditioned surface 502 may be textured or non-textured. In this example, the conditioned surface 502 is textured to include one or more depressions, recesses, cavities or pockets 506 via, for example, the manufacturing processes noted above. As shown, the conditioned surface 502 is textured to include a plurality of recesses 508 disposed along a face or surface 510 of the movable valve apparatus 500 that interfaces with and contacts a face 512 of the packing material 504. Each of the recesses 508 is sized to receive material deposits 514, which may have properties substantially similar or identical to the properties of the packing material 504. The recesses 508 may be any suitable size or dimension for a particular application and/or may be any suitable size to control a desired amount of material deposits 514 to be transferred to the movable valve apparatus 500 to provide the conditioned surface 502. Additionally or alternatively, in other examples, the material deposits 514 may be any suitable material different than the packing material 504 such as, for example, a lubricating material that is relatively softer than the packing material 504. In yet other examples, the material deposits 514 may be a combination of the packing material 504, polytetrafluoroethylene (PTFE), polyetheretherketone (PEEK), high-density polyethylene, polyolefin, an inert bonding agent, and/or any other suitable material(s).

Via the direct method, the movable valve apparatus 500 is moved or cycled against a lubricating material such as, for example, a packing material (e.g., the packing material 504), a laminated packing material (e.g., graphite/PTFE packing rings 134 of FIG. 3), etc. To transfer a lubricating material or agent to the movable valve apparatus 500 to provide the conditioned surface 502, the movable valve apparatus 500 may be assembled with a test fixture, a bench valve or a bonnet-like fixture. The movable valve apparatus 500 is cycled against the relatively softer lubricating material to form the material deposits 514. For example, the movable valve apparatus 500 may be implemented with a bench valve in the shop and cycled (e.g., rotated or stroked) so that the movable valve apparatus 500 moves against a packing material (e.g., the packing material 132 of FIGS. 1A and 1B) disposed within a bonnet of the bench valve. The lubricating material may be loaded to a predetermined compression or high stress level and/or applied with heat (e.g., a temperature no greater than 600° F.) and the movable valve apparatus 500 may be actuated to move against or along the lubricating material 504 (e.g., a graphite packing material) to cause material deposits 514 to transfer to, be enfolded by, fill or embed the conditioned surface 502.

Once the conditioned surface 502 enfolds the material deposits 514, the movable valve apparatus 500 is removed from the bench valve and assembled with a fluid valve for use in the field. Additionally, the conditioned surface 502 may be processed via, for example, roller burnishing, emery cloth, or any other process(es) to provide a glazed finish surface. The glazed surface may further reduce friction and prevent the further transfer of packing material to the movable valve apparatus 500. The movable valve apparatus 500 may then be assembled within a valve for use in the field.

In another example, to provide the conditioned surface 502 via the direct method, the material deposits 514 are transferred to the movable valve apparatus 500 via a tool or machine (e.g., a lathe). In one particular example, the material deposits 514 are transferred to, enfolded by, impregnated or embedded within the recesses 508 by engaging the relatively softer material deposits 514 with the movable valve apparatus 500 while the valve apparatus is rotating in, for example, a lathe.

In some examples, a lubricating material may include a bonding agent or resin to help bind the lubricating material (e.g., a graphite material) to the conditioned surface (i.e., to help enfold the lubricating material with the movable valve apparatus 500). Such lubricating material is particularly advantageous for use with non-textured, conditioned surfaces (e.g., the non-textured surface 416 of FIG. 4D). In one example, the movable valve apparatus 500 may be implemented with a lubricating material having a graphite packing and a PTFE composite. For example, the movable valve apparatus 500 may be cycled against the laminated graphite/PTFE rings (e.g., the packing rings 134 of FIGS. 1A and 1B) of a bench valve. The laminated packing ring may include, for example, a flexible graphite ring of sheet material (e.g., 87% graphite, 80% graphite, etc.) that is laminated with a PTFE ring of PTFE sheet material (e.g., 13% PTFE, 20% PTFE, etc.). An example laminated ring is described in U.S. Pat. No. 5,299,812 and U.S. Pat. No. 5,542,681, both of which are incorporated herein by reference in their entireties. The laminated graphite/PTFE packing ring may be compressed (e.g., via a live-load valve packing) and may be heated (e.g., to a temperature of 600° F.) to help the transfer of the composite lubricating material to the conditioned surface 502. In some examples, such process provides a smooth, ebony glazed surface or conditioned surface.

The PTFE lubricant may help with adhesion of the graphite material to the textured and/or non-textured surface of the movable valve apparatus 500. In one particular example, after the conditioned surface 502 enfolds and/or is embedded with the graphite packing material and the PTFE lubricant, the movable valve apparatus 500 may be heated to a temperature above the sublimation temperature of the PTFE lubricant, thereby removing any PTFE lubricant material that may be embedded substantially near or adjacent the face 510 of the movable valve apparatus 500. In yet other examples, a composite laminated packing ring may include a graphite material or other lubricating material that is laminated with, for example, polyolefins, polytetrafluoroethylene (PTFE), Polyetheretherketone (PEEK), high-density polyethylene, low-density polyethylene, polyolefin, Polybenzimidazole (PBI), and/or any other suitable material(s) that helps or enables bonding of the lubricating (graphite) material to a textured and/or non-textured surface of a movable valve apparatus.

In operation, the material deposits 514 transferred to, enfolded by (or held by) the conditioned surface 502 move relative to and are in contact with the packing material 504. As a result, the proportion or percentage of the face 510 that is made of the relatively harder material of the movable valve apparatus 500 and which contacts the face 512 of the packing material 504 is substantially reduced. Thus, at a wear surface or the interface 516, a relatively large portion of the engaged surfaces are made of like or similar materials, thereby significantly reducing friction and substantially eliminating material transfer that might otherwise occur between two dissimilar materials as described above in connection with FIG. 2. Additionally, in some examples, a glazed conditioned surface 502 and/or lubricating material may further reduce friction at the interface 516.

Thus, the example methods and apparatus described herein provide a homogeneous fault line along the interface 516 between two dissimilar materials that prevents removal or transfer of material between the packing material 504 and the relatively hard face or surface 510 of the movable valve apparatus 500. More specifically, the homogenous fault line provides a natural or controlled interface or line of motion to control material transfer or material deposits 514 when two dissimilar materials (e.g., the movable valve apparatus 500 and the packing material 504) are moving relative to and in contact with each other. Controlling the build-up of the material deposits 514 at the interface 516 significantly reduces friction and, thus, wear between the two dissimilar materials that form the packing material 504 and the movable valve apparatus 500 (e.g., a valve stem or shaft).

Figure 6:
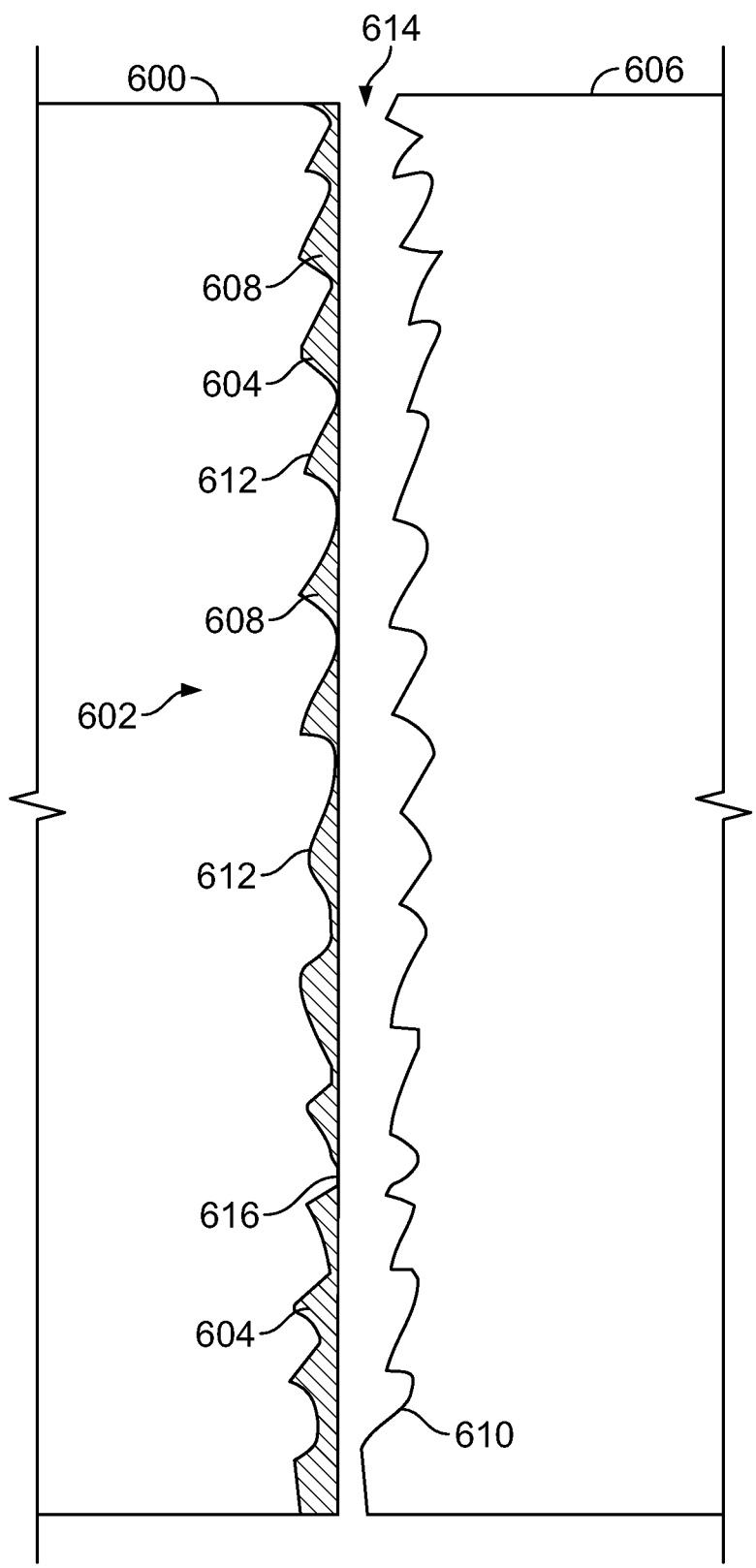
FIG. 6 illustrates an enlarged portion of yet another example valve apparatus described herein having a surface conditioned via an indirect method.

FIG. 6 illustrates another example movable valve apparatus 600 having a surface 602 conditioned via an indirect method. The conditioned surface 602 may be textured (e.g., may have grooves, cavities, openings, etc.) or non-textured. If textured, the conditioned surface 602 may be textured via, for example, machining, knurling, sandblasting, etching (chemical etching), and/or any other suitable manufacturing process (es). In contrast to the methods described in connection with FIG. 5, a lubricating material or agent 604 is naturally transferred to, enfolded by embedded within, or otherwise held by the conditioned surface 602 during operation. As shown in FIG. 6, to apply or transfer the lubricating material 604 to the movable valve apparatus 600 via an indirect method, the movable valve apparatus 600 is assembled with a fluid valve for use in the field without the lubricating material or agent 604 initially being transferred to, disposed on, enfolded by or embedded within the conditioned surface 602.

In operation, as the movable valve apparatus 600 cycles or moves relative to a packing material 606, the packing material 606 will yield to the movable valve apparatus 600 because the movable valve apparatus 600 is made of a relatively harder material (e.g., stainless steel, etc.) than the packing material 606. As the movable valve apparatus 600 moves relative to the packing material 606, small portions of material deposits 608 break-away from a surface or face 610 of the packing material 606 and transfer to the conditioned surface 602. In this example, the conditioned surface 602 has a textured surface that includes recesses 612. The recesses 612 receive the material deposits 608 from the packing material 606. For example, cycling a valve having the movable valve apparatus 600 against the graphite packing material 606 will cause the material deposits 608 of the graphite packing material 606 to transfer to, be enfolded by, or become embedded within the conditioned surface 602.

In this example, as the movable valve apparatus 600 continues to move (e.g., slides or rotates) relative to the packing material 606, the material deposits 608 of the relatively softer packing material 606 break-away from the face 610 and transfer to the conditioned surface 602 until the recesses 612 are become embedded or filled with the material deposits 608. Once the recesses 612 are filled or embedded with the material deposits 608, the material deposits 608 held by the conditioned surface 602 move against, contact or engage the face 610 of the packing material 606, thereby significantly reducing friction at an interface or wear surface 614 between the movable valve apparatus 600 and the packing material 606. In other words, the conditioned surface 602 of the movable valve apparatus 600 provides an interface or line of motion between two substantially similar materials because an amount or percentage of a face or surface 616 of the movable valve apparatus 600 that contacts or engages the face 610 of the packing material 606 is substantially reduced.

As a result, even though the conditioned surface 602 does not enfold the lubricating material 604 when initially placed in operation, a natural or controlled fault line will form along the interface or wear surface 614 between the movable valve apparatus 600 and the packing material 606 when the movable valve apparatus 600 moves relative to the packing material 606. Additionally, friction and wear will be reduced because the contact area between the face 616 of the movable valve apparatus 600 and the face 610 of the packing material 606 having a dissimilar material is substantially reduced as the conditioned surface 602 receives (i.e., is filled with) the material deposits 608 of the packing material 606 during operation of a fluid valve. Further, the recesses 612 may be sized or dimensioned (e.g., have a depth and shape) to control the amount of material deposits 608 to be received by the conditioned surface 602. In this manner, the amount of material deposits 608 that break-away from the face 610 of the packing material 606 can be controlled.

In contrast to the example hard surface or valve apparatus 204 and the packing material or softer material 202 of FIG. 2 in which the valve apparatus 204 can cause excessive removal or transfer of material deposits between the valve apparatus 204 and the packing material 202, the example movable valve apparatus 600 shown in FIG. 6 (and also the example movable valve apparatus 300, 402-408 and 500 shown in FIGS. 3, 4A-4D, and 5) limits or controls the amount of material deposits 608 removed from the face 610 of the packing material 606. Controlling the dimension or size of the textured (e.g., the recesses or apertures) or non-textured conditioned surface 602 limits or controls the amount of material transfer from the face 610 of the packing material 606 because once the material deposits 608 of the packing material 606 transfer to, embed or fill the conditioned surface 602 (e.g., a textured or non-textured surface) of the movable valve apparatus 600, friction at the interface 614 is significantly reduced. As a result, further material transfer from the packing material 606 to the movable valve apparatus 600 is substantially prevented or limited once the conditioned surface 602 enfolds or is embedded with the material deposits 608 of the packing material 606.

Figure 7:
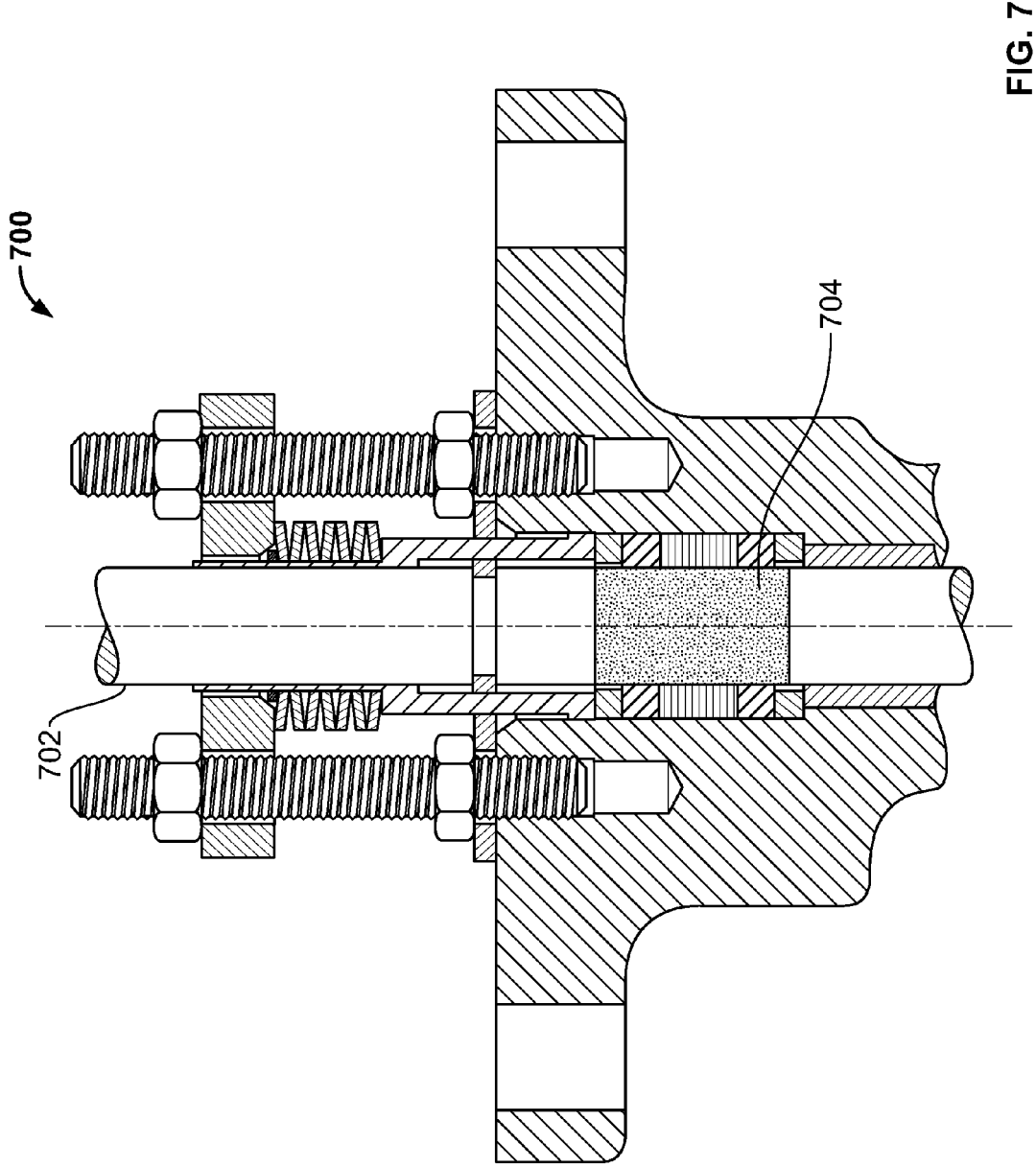
FIG. 7 illustrates a rotary valve implemented with an example valve apparatus described herein.

The example methods and apparatus described herein may be used to substantially reduce or eliminate material transfer between two dissimilar materials that contact each other at an interface or wear surface (e.g., a line of motion) when a first or hard material or surface moves (e.g., slides or rotates) relative to a second or relatively softer material. For example, FIG. 7 illustrates another example fluid valve (e.g., a rotary valve) 700 that may be implemented with an example movable valve apparatus 702 (e.g., a valve shaft) described herein. Such valve apparatus includes a conditioned surface 704 that may have a textured or non-textured surface. Additionally, the conditioned surface 704 may be provided via direct or indirect methods described above.

The example methods and apparatus described herein may be used with sliding stem valves, rotary valves, reciprocating pumps or any other type of fluid control device having two dissimilar materials moving relative to and in contact with each other. Additionally or alternatively, the example methods and apparatus described herein may be used in any application in which wear would otherwise occur at an interface between at least two dissimilar materials or surfaces that move (e.g., slide or rotate) relative to and in contact with each other during operation. Such applications include, but are not limited to, grinding applications (e.g., sand grinding), mining and drilling applications, bearing materials or assemblies, etc.

Although certain methods and apparatus have been described herein, the scope of coverage of this patent is not limited thereto. To the contrary, this patent covers all methods and apparatus fairly falling within the scope of the appended claims either literally or under the doctrine of equivalents.

What is claimed is:

1. An apparatus for use with a fluid valve, comprising:
   a movable valve apparatus made of a first material, wherein the movable valve apparatus is to move relative to a second surface made of a second material that is softer than the first material; and
   a textured surface to hold a lubricating material in recesses, grooves, or cavities defining the textured surface along a portion of the movable valve apparatus that is to contact the second surface in operation, wherein a majority of the textured surface comprises the recesses, grooves, or cavities such that more of the lubricating material engages the second surface than the first material engages the second surface, the lubricating material to be substantially similar or identical to the second material, the lubricating material creating a substantially homogeneous fault line between the textured surface of the movable valve apparatus and the second surface.

2. An apparatus of claim 1, wherein the movable valve apparatus comprises a valve stem or a valve shaft.

3. An apparatus of claim 1, wherein the first material comprises stainless steel and the second material comprises graphite.

4. An apparatus of claim 1, wherein the textured surface comprises a plurality of grooves.

5. An apparatus of claim 1, wherein the lubricating material comprises graphite.

6. The apparatus of claim 1, wherein the lubricating material comprises a dry lubricant.

7. An apparatus of claim 1, wherein a first surface area of the textured surface corresponding to the recesses, cavities or pockets is greater than a second surface area of the textured surface between adjacent recesses, cavities, or pockets.

8. An apparatus, comprising:
   means for holding a lubricating material on at least a portion of a valve shaft or stem made of a first material, wherein the means for holding the lubricating material is to move relative to and in contact with a second surface made of a second material softer than the first material, the first material of the shaft or stem to interface with a first portion of the second surface and the lubricating material to interface with a second portion of the second surface, a surface area of the second portion to be greater than a surface area of the first portion, wherein the lubricating material is a dry lubricant, the lubricating material on the shaft or stem creating a substantially homogenous fault line between the shaft or stem and the second surface.

9. An apparatus of claim 8, further comprising means for transferring the lubricating material to the means for holding the lubricating material.

10. An apparatus of claim 8, further comprising means for providing a glazed surface to the means for holding the lubricating material.

11. An apparatus comprising:
a shaft or stem movable relative to a packing material in a valve; and
a conditioned surface on the shaft or stem to enfold a lubricating material to reduce friction between the conditioned surface and the packing material, the lubricating material to be substantially similar or identical to the packing material, the lubricating material to create a substantially homogeneous fault line between the conditioned surface and the packing material.

12. An apparatus of claim 11, wherein the lubricating material comprises graphite material.

13. An apparatus of claim 11, wherein the lubricating material comprises a dry lubricant.

14. An apparatus of claim 11, wherein the conditioned surface is glazed.

15. An apparatus of claim 11, wherein the conditioned surface is textured.

16. An apparatus of claim 15, wherein the textured surface comprises a surface finish or texture having Arithmetic Average Roughness (Ra) less than 32 micro-inches.

17. An apparatus of claim 15, wherein the textured surface comprises recesses, cavities or pockets.

18. An apparatus of claim 17, wherein the recesses, cavities or pockets correspond to a majority of a surface area of the textured surface.

19. An apparatus of claim 11, wherein the lubricating material is softer than the shaft or stem.

20. An apparatus of claim 11, wherein the lubricating material comprises a bonding agent or resin.

* * * * *